March 2, 1943. W. F. BAHR 2,312,791
CORROSION-PREVENTING CONNECTING MEANS FOR STORAGE BATTERIES
Filed May 31, 1940 2 Sheets-Sheet 1
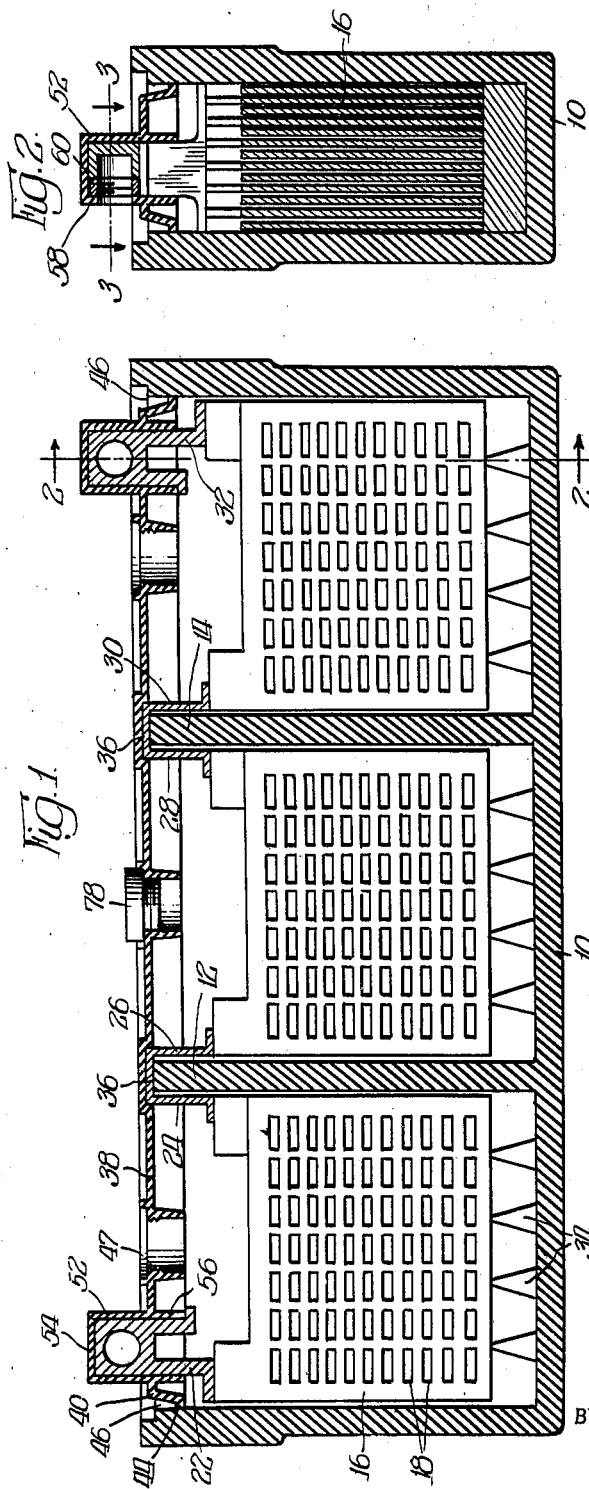
INVENTOR.
William F. Bahr,
BY March 2, 1943.  W. F. BAHR  2,312,791
CORROSION-PREVENTING CONNECTING MEANS FOR STORAGE BATTERIES
Filed May 31, 1940  2 Sheets-Sheet 2
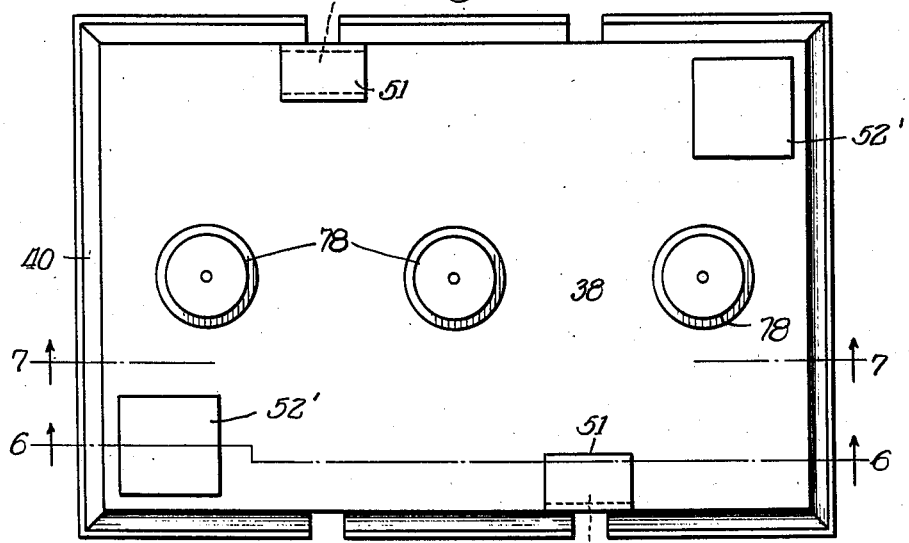
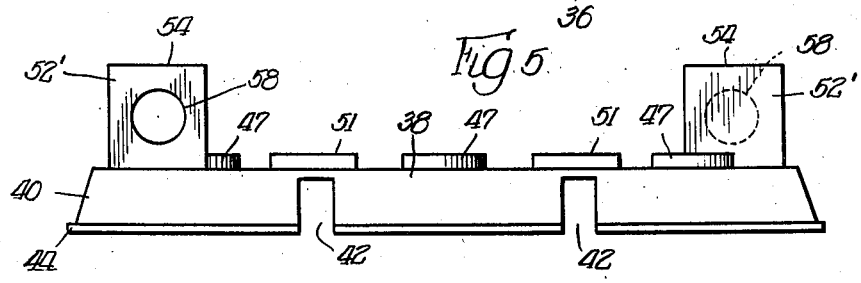
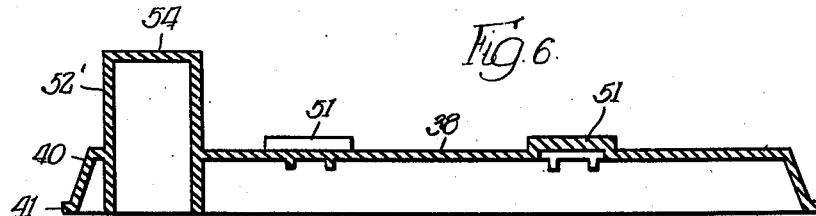
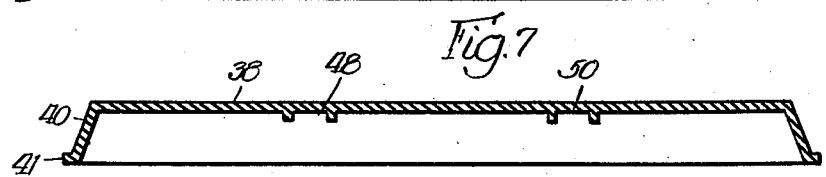
INVENTOR.
William F. Bahr
BY Richard Spencer
ATT.

Patented Mar. 2, 1943

2,312,791

UNITED STATES PATENT OFFICE 2,312,791

CORROSION PREVENTING CONNECTING MEANS FOR STORAGE BATTERIES

William F. Bahr, St. Louis, Mo.

Application May 31, 1940, Serial No. 338,192

6 Claims. (Cl. 136—135)

This invention relates to corrosion preventing connecting means for use in coupling an electric accumulator of the storage battery type to a cable and particularly has to do with a new and novel terminal post for use in conjunction with an improved cable coupling.

The storage battery in general use for automotive purposes today is of the Pb-H₂SO₄ type, more commonly referred to as the lead and sulphuric acid storage battery, and it is common knowledge that a corrosion product of a bluish-green appearance collects on the terminal posts and cable couplings of these batteries and ultimately impairs the electric conductivity therebetween. This substance is a copper sulphur compound which forms when the sulphuric acid and sulphur fumes from the cells of the battery contact the copper of the cable coupling, particularly in the presence of an electric current. This compound is a non-conductor and inasmuch as it collects between the lead terminal post and the copper coupling it reduces the electric conductivity between the terminal post and the coupling and destroys the latter. Broadly, the object of this invention is to eliminate the formation of this compound.

One object of this invention is to minimize the escape of sulphuric acid and sulphuric acid fumes from the battery cells. A feature contributing toward the sealing of the sulphuric acid and its fumes within the battery is the provision of a termianl post hood which is formed integral with the battery lid and into which the terminal post from the battery extends. As will appear more clearly hereinafter, this hood or shield member may be made liquid and gas tight by inserting the lead post into the mold at the time that the plastic lid member is being formed. On the other hand, it is not necessary that the terminal post and the hood be liquid tight for as will appear hereafter a cable connector is inserted inside a cavity in the battery post through an orifice in the hood and is so held therein by an acid resisting collar and ring as to leave no part of the copper connector exposed.

Toward attaining this objective of sealing the acid and fumes in the battery, the applicant substitutes for the conventional three lids of the three cells of the ordinary automobile storage battery a single lid having novel means for assuring a tight fit with the battery container and for permitting the use of interior conductors connecting the battery cells in series in the conventional manner. The applicant's single lid is so shaped that the tightness of each cell with respect to a neighboring cell is not impaired as it is desirable that each cell be a complete electric accumulator uninfluenced by the condition of an adjoining cell.

Another object of this invention is to enclose the copper connector on the cable end so that even if there is an escape of sulphuric acid or fumes, no copper will be exposed to attack by the acid. A feature contributing toward this end is the provision of a cylindrical seat in the terminal post within the plastic hood or shield and the positioning in the outer edge of this cylindrical seat of a hardened interiorly threaded ring. The end of the cable is formed with a cylindrical connector adapted to be inserted in this seat or socket in the terminal post and has an exteriorly threaded collar for engaging the interior threads of the ring whereby the drawing up of the collar will firmly seat the cable connector in the terminal post and leave no copper surface exposed.

These and such other objects as may hereinafter appear are attained in one embodiment of this invention shown in the drawings, wherein:

Figure 1 is a sectional view of a storage battery having the cells disposed in end to end relationship;

Figure 2 is a sectional view taken on the line 2—2 of Figure 1;

Figure 3 is a view of a cable illustrating the new and improved electrodes seated in the battery terminal post;

Figure 4 is a plan view of a lid embodying the features of applicant's invention for use with a battery having the cells disposed in side by side relationship;

Figure 5 is a side elevation of the lid shown in Figure 4;

Figure 6 is a sectional view taken on the line 6—6 of Figure 4; and

Figure 7 is a sectional view taken on the line 7—7 of Figure 4.

Continuing to refer to the drawings, and particularly to Figure 1, the numeral 10 identifies a molded plastic container having partitioning walls 12 and 14 which divide the container into three compartments. The electric storage elements are of the conventional type and comprise in each cell groups of plates 16 wherein the active materials 18 are supported in a grid, which here is in lattice form. As is well understood, every other plate is coupled to one of the two poles or terminal posts of the cell, and, continuing to refer to Figure 1, the terminal post for the three cells bear the numbers 22, 24, 26, 28, 30 and 32. The lattice plates 16 are supported on fins 34.

It will be observed that the terminal post 24 of the left hand cell is connected to the terminal post 26, which is of a different sign, by means of a conductor 36. These conductors 36 do not protrude through a lid 38 which covers all of the cells of the battery. These conductors 36 are flat. By eliminating holes in the lid for terminal posts in order to establish connections between the posts of the various battery cells, applicant eliminates any openings through which sulphuric acid fumes may escape from the batteries except the small amount escaping through the perforations in the breather caps.

Describing now the lid 38 which contributes largely to the effectiveness of applicant's battery, it will be observed by referring to Figure 5 that this lid consists of a molded plastic which has a downwardly directed flange 40 extending around its entire perimeter with cut outs 42 for permitting it to extend well down over the partitions 12 and 14. The battery lid shown in Figures 4 through 7 is for a conventional three cell storage battery wherein the cells are disposed in side by side relationship. The features which are now being described are equally applicable to the lid 38, shown in Figures 1 and 2, and it was deemed unnecessary to show side elevations, plan and sectional views of the lid shown in Figure 1, or to describe the two lids separately. In the battery shown in Figures 1 and 2 the inter-cell connector 36 is disposed midway between the sides of the battery whereas in the form shown in Figures 4 through 7 the inter-cell connector 36', shown in Figure 4 in dotted position, is disposed at the opposite sides of the battery.

Resuming, the lower edge 44 of this flange 40 is turned outwardly and in assembling the lid 38 with the batteries, it is simply rested on the partitions 12 and 14 and then an acid-proof filler is flowed into the space 46, see Figure 1. Referring to Figure 4 it is evident that the only joinder that needs to be sealed between this lid and the three cells of the battery is that around the perimeter, excepting, of course, the refill holes 47 and the two terminal posts which will be hereinafter explained. Referring to Figure 7, the underside of the lid 38 has two transverse channels 48 and 50 which cooperate with the cut out portions 42 of the side walls to permit the partitioning walls 12 and 14 to be seated snugly against the underside of the lid. In order that the conductors 36, see Figure 1, will not interfere with the proper seating of the lid 38 on the partitions 12 and 14, offset portions 51 are provided in the lid, see Figures 6 and 4.

Examining now the second feature which contributes to the prevention of the escape of sulphuric acid or acid fumes from the battery, it will be observed in Figures 1, 2 and 3 that a vertical hood is formed integral with the top 38 in one corner thereof as shown in Figure 4 at 52' or centrally of the cell as at 52 in Figures 1 and 2. The hood members 52 and 52' have a closed top portion 54 and a depending portion 56. Into the depending portion 56 is inserted the terminal post 22 coupled to the grid plates 16 of the battery. Referring now to Figures 2 and 3, a circular opening 58 is formed in the plastic hood or shield 52 and there is disposed immediately inside this opening a hardened alloy ring 60 which may best be seen in Figure 3. This ring 60 is interiorly threaded and is anchored in the lead of the terminal post 22.

This lead terminal post is bored in alignment with the opening 58 so as to have a circular cross-section and is adapted to receive a copper connector 62 sweated on one end of a cable 64 having an insulating sheathing 66. The connector 62 will clear the interior threads of the ring 60 and it has an inner shoulder 68 which may be engaged by an exteriorly threaded collar 70 having wrench-engaging surfaces 72. By inserting the connector 62 into the cylindrical seat of the lead post within the hood 52 and drawing up the collar 70, all exposed copper surfaces will be enclosed within the plastic hood 52 at 74. The collar 70 which is made of an acid resisting material engages the plastic and completely shields the copper connector from outside fumes and the collar and the ring protect the copper connector from fumes or acid seeping upwardly along the terminal post inside of the hood. By this arrangement an acid and fume tight connection is established between the cable 64 and the grid plates 16 of the battery.

The lid 38 has the conventional refill holes 47 for breather caps 78, which are provided for the purpose of adding liquid to the batteries in the usual manner.

In Figure 3, a connector for coupling the free end of the cable to a terminal post in the automobile is illustrated. This connector comprises a copper tube 80 crimped to the electric cable at 82 and flattened at 84. The flattened portion contains a hole 86 to receive a bolt or the like.

It will be appreciated that the disclosure of this invention may be otherwise embodied and yet enable the same results as the embodiment shown in the drawings. In the case of the shielded terminal post, the employment of a portion of the lid as a means of assisting in sealing the outside terminal connection from the inside of the battery could assume a variety of forms. Introducing the cable at right angles to the terminal post or utilizing a circular hole are matters of detail. The important element rests in providing a large surface between the lead post and the inner side of the lid for establishing a cell and then utilizing a cable connection which may be inserted into the lead post so as to leave no copper exposed.

Having thus described my invention, what I claim as new and desire to secure by Letters Patent of the United States, is:

1. A corrosion preventing connecting assemblage for coupling a cable to a storage battery terminal post, comprising a terminal post, a cavity having its major axis at substantially right angles to the major axis of said terminal post, a cable connector shaped so as to seat firmly in said cavity, a ring of a hardness substantially greater than the hardness of the material of the terminal post and having internal threads mounted in the orifice of said cavity and anchored in the lead of the terminal post, and a collar having external threads for engaging the internal threads of the ring and disposed on the cable connector whereby tightening the collar to the ring will position the cable connector inside the cavity whereby points of contact between the cable connector and the cavity will be maintained unexposed.

2. A corrosion preventing connecting assemblage for coupling a cable to a storage battery terminal post, comprising a terminal post, a cavity having its major axis at substantially right angles to the major axis of said terminal post, an interiorly threaded ring of a hardness substantially greater than the hardness of the material of the terminal post and disposed in the orifice of said cavity and anchored in the lead of the terminal post, a copper cable connector shaped to seat firmly in said cavity and having a depth less than the depth of the cavity, an annular shoulder around said connector, and an exteriorly threaded acid resisting collar engaging said shoulder whereby tightening the acid resisting collar on the acid resisting ring will completely encase the cavity in the terminal post.

3. A corrosion preventing connecting assemblage for coupling a cable to a storage battery terminal post, comprising a terminal post, a cavity having its major axis at substantially right angles to the major axis of said terminal post, an acid resisting hood over said terminal post, a hole through said hood in registry with said cavity, an interiorly threaded ring of a hardness substantially greater than the hardness of the material of the terminal post positioned in the orifice of said cavity adjacent to said hood and anchored in the lead of the terminal post, a cable connector shaped so as to seat firmly in said cavity and means engaging said ring for holding the cable connector in assembled relationship with said cavity whereby the points of contact between the cable connector and the cavity are maintained unexposed.

4. A corrosion preventing connecting assemblage for coupling a cable to a storage battery terminal post, comprising a terminal post, a cavity having its major axis at substantially right angles to the major axis of said terminal post, an acid resisting hood over said terminal post, a hole through said hood in registry with said cavity, an interiorly threaded ring of a hardness substantially greater than the hardness of the material of the terminal post positioned in the orifice of said cavity adjacent to said hood and anchored in the lead of the terminal post, a cable connector shaped so as to seat firmly in said cavity, and an acid resisting collar holding said cable connector and having external threads for engaging said ring, whereby upon assembly of the parts, only acid resisting surfaces will be exposed to the air.

5. A corrosion preventing connecting means for use in coupling a storage battery terminal post to a cable comprising a cavity in said terminal post, an acid resisting hood over said terminal post, a hole through said hood in registry with said cavity, a battery lid, a cable connector shaped so as to seat firmly in said cavity and means for holding the cable connector in assembled relationship with said cavity whereby the points of contact between the cable connector and the cavity are maintained unexposed, said hood being formed integral with the lid of the battery through which the terminal post protrudes.

6. A corrosion preventing connecting means for use in coupling a storage battery terminal post to a cable comprising a cavity in said terminal post, an acid resisting hood over said terminal post, a hole through said hood in registry with said cavity, a battery lid for covering a plurality of battery cells, a cable connector shaped so as to seat firmly in said cavity and means for holding the cable connector in assembled relationship with said cavity whereby the points of contact between the cable connector and the cavity are maintained unexposed, said hood being formed integral with said lid.

WILLIAM F. BAHR.